United States Patent
Ozugur et al.

(10) Patent No.: US 7,675,903 B2
(45) Date of Patent: Mar. 9, 2010

(54) DYNAMIC CONTACT LIST MANAGEMENT SYSTEM AND METHOD

(75) Inventors: Timucin Ozugur, Garland, TX (US); Michael S. Wengrovitz, Concord, MA (US)

(73) Assignee: Alcatel Lucent, Paris (FR)

(*) Notice: Subject to any disclaimer, the term of this patent is extended or adjusted under 35 U.S.C. 154(b) by 1428 days.

(21) Appl. No.: 10/963,242

(22) Filed: Oct. 12, 2004

(65) Prior Publication Data

US 2005/0175021 A1 Aug. 11, 2005

Related U.S. Application Data

(60) Provisional application No. 60/542,573, filed on Feb. 6, 2004.

(51) Int. Cl.
*H04L 12/56* (2006.01)

(52) U.S. Cl. .............. 370/352; 455/412.1; 463/42; 709/206

(58) Field of Classification Search .......... 370/352, 370/401; 379/88.13; 705/26; 707/102; 709/203, 206; 455/412.1; 463/42
See application file for complete search history.

(56) References Cited

U.S. PATENT DOCUMENTS

| | | | |
|---|---|---|---|
| 5,748,607 A | 5/1998 | Chira | |
| 6,539,421 B1 * | 3/2003 | Appelman et al. | 709/206 |
| 6,560,329 B1 | 5/2003 | Draginich et al. | |
| 6,614,902 B1 | 9/2003 | Rizzetto | |
| 6,674,725 B2 * | 1/2004 | Nabkel et al. | 370/252 |
| 6,677,968 B1 | 1/2004 | Appelman | |
| 6,754,158 B1 | 6/2004 | Kobayashi | |
| 6,865,384 B2 * | 3/2005 | Sagi et al. | 455/412.1 |
| 6,895,558 B1 | 5/2005 | Loveland | |
| 7,046,789 B1 | 5/2006 | Anderson et al. | |
| 7,123,695 B2 * | 10/2006 | Malik | 379/88.13 |
| 7,233,980 B1 | 6/2007 | Holden et al. | |
| 7,249,161 B2 * | 7/2007 | Srinivas et al. | 709/206 |
| 7,263,183 B1 | 8/2007 | Klein et al. | |
| 7,295,669 B1 | 11/2007 | Denton et al. | |

(Continued)

FOREIGN PATENT DOCUMENTS

DE 10008388 A1 9/2001

(Continued)

OTHER PUBLICATIONS

Abstract of DE 10008388, Sep. 2001, Swyx Communications.

(Continued)

*Primary Examiner*—Gerald Gauthier
(74) *Attorney, Agent, or Firm*—Fay Sharpe LLP

(57) ABSTRACT

A dynamic contact list management (DCLM) method and system operable in a communications network environment. In one embodiment, upon receiving a communication request from an originating party over a first network towards a networked party, a query is generated for determining and locating an IM address associated with the originating party. Upon establishing presence awareness between the originating party and the networked party, the IM address of the originating party is added to a contact list database associated with the networked party. The IM address, which is persistent at least for the duration of a first communication session established responsive to the communication request, may be used for engaging in a second communication session between the parties.

46 Claims, 5 Drawing Sheets

U.S. PATENT DOCUMENTS

| | | | |
|---|---|---|---|
| 7,428,580 B2 * | 9/2008 | Hullfish et al. | 709/207 |
| 7,447,495 B2 * | 11/2008 | Agrawal | 455/412.2 |
| 7,525,951 B2 * | 4/2009 | Musil et al. | 370/352 |
| 7,549,924 B2 * | 6/2009 | Canessa et al. | 463/42 |
| 7,590,696 B1 * | 9/2009 | Odell et al. | 709/206 |
| 7,596,599 B1 * | 9/2009 | Maghsoodnia et al. | 709/206 |
| 2002/0065894 A1 | 5/2002 | Dalal et al. | |
| 2002/0114441 A1 | 8/2002 | Coussement | |
| 2002/0191517 A1 | 12/2002 | Honda | |
| 2003/0009530 A1 | 1/2003 | Philonenko et al. | |
| 2003/0021264 A1 | 1/2003 | Zhakov et al. | |
| 2003/0120783 A1 | 6/2003 | Marschall et al. | |
| 2003/0210777 A1 | 11/2003 | Fromm | |
| 2003/0222965 A1 | 12/2003 | Field | |
| 2004/0001580 A1 | 1/2004 | Mason | |
| 2004/0003037 A1 * | 1/2004 | Fujimoto et al. | 709/203 |
| 2004/0028197 A1 | 2/2004 | Gray et al. | |
| 2004/0028208 A1 | 2/2004 | Carnazza et al. | |
| 2004/0056944 A1 | 3/2004 | Bronson | |
| 2004/0267625 A1 * | 12/2004 | Feng et al. | 705/26 |
| 2005/0044152 A1 * | 2/2005 | Hardy et al. | 709/206 |
| 2005/0141483 A1 | 6/2005 | Wengrovitz | |
| 2005/0141688 A1 | 6/2005 | Wengrovitz | |
| 2005/0141689 A1 | 6/2005 | Wengrovitz | |
| 2005/0141690 A1 | 6/2005 | Wengrovitz | |
| 2005/0141691 A1 | 6/2005 | Wengrovitz | |
| 2005/0144279 A1 * | 6/2005 | Wexelblat | 709/225 |
| 2005/0147227 A1 | 7/2005 | Chervirall et al. | |
| 2009/0043805 A1 * | 2/2009 | Masonis et al. | 707/102 |

FOREIGN PATENT DOCUMENTS

| | | |
|---|---|---|
| EP | 0721266 A2 | 7/1996 |
| EP | 098175 A2 | 2/2000 |
| EP | 1313330 A1 | 5/2003 |
| EP | 1317120 A2 | 6/2003 |
| EP | 1363444 A2 | 11/2003 |
| WO | WO 02/073886 A1 | 9/2002 |
| WO | WO 03/025776 A1 | 3/2003 |
| WO | WO 03/030003 A1 | 4/2003 |
| WO | WO 03/085996 | 10/2003 |
| WO | WO 2004/056137 A1 | 7/2004 |

OTHER PUBLICATIONS

Abstract of EP 09890175, Feb. 2000, Tenoris GmBH & Company.

Abstract of EP 1313330, May 2003, Alcatel.

Tessot, J.; Instant Messaging; Alcatel Telecommunications Review; Technical Review; Oct. 2003; pp. 1-9; Paris, France.

M. Day et al.; Network Working Group; "A Model for Presence and Instant Messaging"; Feb. 2000; pp. 1-17.

M. Day et al.; Network Working Group; "Instant Messaging/Presence Protocol Requirements"; Feb. 2000; pp. 1-26.

H. Schulzrinne et al.; Internet Engineering Task Force; "RPIDS—Rich Presence Information Data Format for Presence Based on the Session Initiation Protocol (SIP)"; draft-schulzrinne-simple-rpids-01.ps; Feb. 18, 2003; pp. 1-16.

* cited by examiner

DYNAMIC CONTACT LIST MANAGEMENT SYSTEM AND METHOD

PRIORITY UNDER 35 U.S.C. §119(e) & 37 C.F.R. §1.78

This nonprovisional application claims priority based upon the following prior U.S. provisional patent application entitled: "PRESENCE BASED ROUTING WITH INTEGRATION OF INSTANT MESSAGING AND TELEPHONY," Application No. 60/542,573, filed Feb. 6, 2004, in the name(s) of Timucin Ozugur and Michael S. Wengrovitz; which is hereby incorporated by reference in its entirety for all purposes.

CROSS-REFERENCE TO RELATED APPLICATION(S)

This application discloses subject matter related to the subject matter disclosed in the following commonly owned co-pending patent application(s): (i) "PRESENCE-BASED ROUTING IN A COMMUNICATIONS NETWORK ENVIRONMENT," application Ser. No. 10/962,792, filed Oct. 12, 2004, in the name(s) of: Timucin Ozugur and Michael S. Wengrovitz; (ii) "CALL TREATMENT IN A COMMUNICATIONS SYSTEM BASED ON INSTANT MESSAGING," application Ser. No. 10/962,773, filed Oct. 12, 2004, in the name(s) of: Timucin Ozugur and Michael S. Wengrovitz; and (iii) "CLIENT-BASED INTEGRATION OF PBX AND MESSAGING SYSTEMS," application Ser. No. 10/750,795, filed Dec. 31, 2003, in the name(s) of Michael S. Wengrovitz, which is (are) hereby incorporated by reference.

BACKGROUND OF THE INVENTION

1. Technical Field of the Invention

The present invention generally relates to presence-aware communication networks. More particularly, and not by way of any limitation, the present invention is directed to a dynamic contact list management system and method operable in a communications network environment.

2. Description of Related Art

With today's widespread use of the Internet as a major communication medium, data communication devices are now being designed so that they are capable of communicating over packet-switched networks. For instance, telephones, pagers, personal digital assistant devices, cell phones, hand-held computers, and even fax machines can now be accessed and controlled from the Internet. Communication over a packet-switched network using communication devices that traditionally communicate over a circuit-switched telecommunications network is generally known as network telephony, or IP telephony when an IP network is involved.

Various types of user communication devices (e.g., a cell phone, laptop or handheld PC, desktop PC, and the like) can identify themselves to the network using a suitable identifier (e.g., username@company.com). "Presence" refers to, for example, the availability, proximity, activity level or operating state of a user or device on a network. The ability for users to monitor each other's presence is a feature offered in connection with many applications that support network telephony. For example, instant messaging (IM) applications such as MSN®, Yahoo®, et cetera, have an "available buddy" feature, in which a user of the application can determine whether select users are available for engaging in communication. The data retrieved and returned to the buddy list, e.g. "John OFFLINE" or "Susan ACTIVE", is known as "presence information," and is generally maintained by a presence server in the data network, often a dedicated server. Typically, the presence server supports network protocols such as the Session Initiation Protocol (SIP). Users can register their communication devices with the presence server in order to have their presence maintained and to allow various programs on the network to facilitate network telephony services. A first device user wishing to detect the presence of a second device user does so by "subscribing" with the presence server, such as via a SIP SUBSCRIBE message. The presence server intermediates between the first device user (also known as the watcher or subscriber) and the second device user to facilitate the communication of the second device user's presence information to the first device user.

Additional details concerning presence and presence data modeling are set forth in the Internet Engineering Task Force (IETF) Request for Comment (RFC) 2778 entitled "A model for Presence and Instant Messaging," dated February 2002; RFC 2779 entitled "Instant Messaging/Presence Protocol Requirements," dated February 2002; and Internet-Draft identified as <<draft-schulzrinne-simple-rpids-01.ps>> and entitled "RPIDS—Rich Presence Information Data Format for Presence Based on the Session Initiation Protocol (SIP)," dated Feb. 18, 2003, which are incorporated herein by reference.

Although presence and IM applications have been implemented in a variety of settings such as those exemplified hereinabove, several areas remain deficient in terms of presence and contact list management.

SUMMARY OF THE INVENTION

The present invention is directed to a dynamic contact list management (DCLM) method and system operable in a communications network environment. In one embodiment, upon receiving a communication request from an originating party over a first network towards a networked party, a query is generated by a DCLM logic functionality for determining and locating an instant message (IM) address associated with the originating party. For purposes of the present patent application, a SIP address or SIP Uniform Resource Indicator (URI) may be treated as the IM address, by way of example. Upon establishing presence awareness between the originating party and the networked party, the IM address of the originating party is dynamically added to a contact list database associated with the networked party. The IM address, which is persistent at least for the duration of a first communication session established responsive to the communication request, may be used for engaging in a second communication session between the parties.

In another embodiment, the DCLM logic is operable to generate a query to determine an IM address associated with a knowledge-specific entity relative to a networked party disposed in a presence-capable network. The query is operable to search for a match between the IM address and a specific skill set or domain expertise of the entity. Upon establishing presence awareness between the knowledge-specific entity and the networked party, the IM address is added to a contact list database associated with the networked party, which may be persistent for a predetermined amount of time, whereupon the IM address may be deleted.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
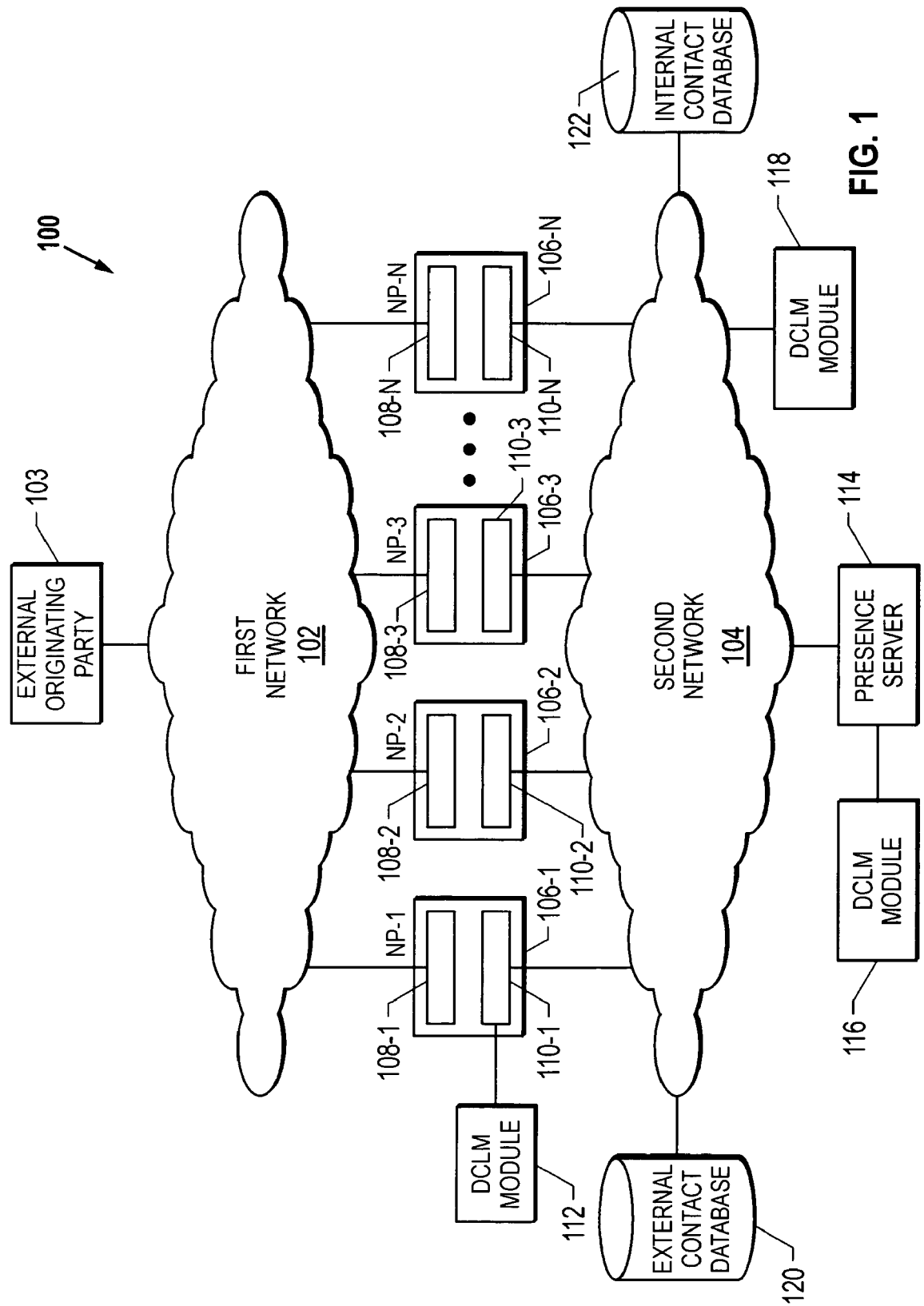
FIG. 1 depicts an embodiment of a communications network environment wherein a dynamic contact list management (DCLM) system and method may be provided in accordance with an aspect of the present invention.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein an embodiment of a communications network environment 100 wherein a dynamic contact list management (DCLM) system and method may be provided in accordance with an aspect of the present invention. As illustrated, the communications network environment 100 is comprised of a first network 102 and a second network 104, wherein an external originating party 103, i.e., a caller or calling party, is operable to initiate the communication event request (or, simply "communication request" or "request") over one of the networks, e.g., the first network 102, for delivery to an intended networked party that is networked to both first and second networks. By way of example, a plurality of networked parties NP-1 106-1 through NP-N 106-N are operable to access the first network 102, each using a suitable first communication device, 108-$i$, i=1, 2, . . . , N. Likewise, NP-1 106-1 through NP-N 106-N are also operable to access the second network 102, each using a suitable second communication device 110-$i$, i=1, 2, . . . , N.

At the outset, it should be realized by those skilled in the art that for purposes of the present invention, the first and second networks may comprise any known or heretofore unknown telecommunications or data communications networks, either private or public, as long as one of them, e.g., the second network 104, is capable of operating as a presence-aware network. Accordingly, the first network 102 can be a network selected from the group consisting of an enterprise communications network, e.g., a digital Private Branch Exchange (PBX) network, at least a portion of a public circuit-switched voice communications network such as the Public Switched Telephone Network (PSTN) or a cellular/mobile/wireless communications network, or a packet-switched network, e.g., an Internet Protocol (IP)-based network. In terms of the type of communications that can be supported, it is envisaged that the first network 102 is capable of supporting voice communications, video communications, data communications, text message communications, electronic mail (email) communications, multimedia communications, or any combination or combinations thereof. As a consequence, the term "call" or "communication request" used in reference to a communication event initiated by the originating party 103 should be construed broadly and can include any communication event relating to the communication types exemplified herein (e.g., voice calls, video calls, text messages, email messages, video mail messages, multimedia calls, et cetera). Correspondingly, the first communication devices 108-1 to 108-N associated with the networked parties may comprise wireline telephones, wireless telephones, PBX digital phones, video phones, text messaging devices, Voice-over-IP (VOIP) or web phones, and the like, depending on particular network implementation and application.

As alluded to in the foregoing, the second network 104 is preferably operable as a presence-aware network wherein presence information relating to the networked parties as well as other originating parties and associated communication devices may be collected and shared using any presence-capable network protocol. By way of example, the second network may be implemented as an IP-based network that is operable with a presence application protocol such as one selected from the group consisting of SIP, Extensible Messaging and Presence Protocol (XMPP), IBM Sametime protocol, and so on. Furthermore, the second network 104 may comprise a local area network, wide area network, an enterprise intranet network, or a public packet-switched network such as the Internet. Accordingly, the second communication devices 110-1 to 110-N associated with the networked parties may comprise a computing/communication device such as, e.g., a desktop or laptop personal computer, although any hardware platform operable with a presence application may be provided as part of the second network 104 within the context of the present invention. Additionally, in a further embodiment, the first and second communication devices associated with a networked party may be integrated into a single device, e.g., equipment that supports computer telephony integration (CTI), with which the networked parties may access both first and second networks. For instance, additional details regarding integration of PBX phones and presence-capable computer equipment may be found in the following co-pending commonly assigned United States nonprovisional patent application entitled: "CLIENT-BASED INTEGRATION OF PBX AND MESSAGING SYSTEMS," application Ser. No. 10/750,795, filed Dec. 31, 2003, in the name(s) of Michael S. Wengrovitz, cross-referenced hereinabove.

To facilitate presence information collection and sharing, i.e., presence awareness, a presence server 114 may be provided as part of the second network 104. In one embodiment, the presence information relates to the presence state/data of the networked parties as well as any external parties, and their associated communication devices (e.g., "OFFLINE"; "ONLINE"; "OUT TO LUNCH"; "BUSY"; "IDLE"; "ON PHONE"; "IN CONFERENCE"; "WITH CUSTOMER"; "KEYBOARD INACTIVE"; "CALL WAITING"; "OFF-HOOK"; "RINGING", et cetera). In accordance with the teachings of the present invention, a contact list that is dynamically managed may be provided for any networked party, wherein a contact may be an external party, that is, a party not included in the enterprise network of the networked parties NP-1 through NP-N, such as, e.g., external originating party 103, or an internal party, i.e., one of the networked parties ("co-worker" parties). A dynamic contact list management (DCLM) logic function operable to generate a query to determine and locate the IM address and other IM-related indicia of a calling party may be provisioned in the communications network environment 100 either in a centralized manner (e.g., as a separate network node or as a co-located module associated with a network switch or a presence server) or by way of a distributed arrangement wherein the DCLM logic may be partitioned across one or more network entities, i.e., communication devices associated with the networked parties, or in any combination thereof. As shown in FIG. 1, DCLM module 112 is illustrative of an embodiment where the DCLM logic is provided as an application operating in conjunction with the computing/communication device 110-1 of one particular networked party, i.e., NP-1 106-1. DCLM module 116 exemplifies the provisioning of the DCLM logic as a co-located entity operable in conjunction with the presence server 114. On the other hand, DCLM module 118 exemplifies the provisioning of the DCLM logic as a separate network node disposed in the second network 104. Although not explicitly shown in FIG. 1, those skilled in the art will recognize that the DCLM functionality may also be provisioned as part of a network switch associated with the first network 102 (e.g., as a CTI-enhanced PBX node).

In one embodiment, regardless of where or how the DCLM logic is provisioned in the communications network environment 100, the logic is operable to effectuate the generation of a query for determining and locating the IM address or related indicia of an originating party (which can be an external party such as the external originating party 103 or an internal co-worker party) upon receiving a communication request therefrom towards a particular networked party (e.g., NP-1 106-1) for whom a dynamically-managed contact list database is provisioned. Upon determining the IM address and establishing presence awareness between the originating party and the networked party, the IM address is added to the contact list database of the networked party, which IM address can be persistent at least for the duration of a communication session set up responsive to the communication request. As can be appreciated, the IM address and/or related indicia (e.g., an alias, screen name, or a handle, etc.) of the originating party may be used for establishing another communication session with the networked party, which may involve complementary communications in addition to the first communication session. By way of example, the first communication session may be a voice call session whereas the second communication session using the dynamically-acquired IM address of the originating party (who is now added as a dynamic contact) may involve an escalated communication session such as an instant message session, a text chat session, a multimedia session, a document exchange session, or a desktop sharing session, or any combination thereof.

In an exemplary implementation, the telephone numbers and matching IM addresses/indicia associated therewith are provisioned in a service database, such as a white pages database served by a server that is operable with respect to external originating parties. In another exemplary implementation, such data may be provisioned as an internal database associated with a Lightweight Directory Access Protocol (LDAP)-based server that is operable to serve an enterprise including the receiving networked party as well as the internal originating party, i.e., the co-worker party. Further service database implementations may include Active Directory databases, Structured Query Language (SQL) databases, IBM Databases, et cetera. As shown in FIG. 1, reference numeral 120 refers to an external contact address information database and reference numeral 122 refers to an internal contact address information database, which are illustrative of the aforesaid implementations.

In a further embodiment, the DCLM logic is operable to generate a query to determine an IM address associated with a knowledge-specific co-worker of a networked party disposed in a presence-capable network such as the network 104. The query is operable to search for a match between the IM address and a specific skill set of the co-worker. Upon establishing presence awareness between the knowledge-specific co-worker and the networked party, the IM address is added to a contact list database associated with the networked party, which may be persistent for a predetermined amount of time, whereupon the IM address may be deleted. A similar implementation may be provided for dynamically locating knowledge-specific databases, documents, domain-specific ontologies, etc., within an enterprise that are networked using an appropriate protocol, e.g., as databases served by LDAP servers with suitable SIP interface extensions. Accordingly, a networked party of the enterprise network may dynamically access either knowledge-specific co-workers having particular skill sets (i.e., experts) or other resources, and maintain addresses relating to such entities as dynamic contacts in a contact database for a predetermined time.

Figure 2:
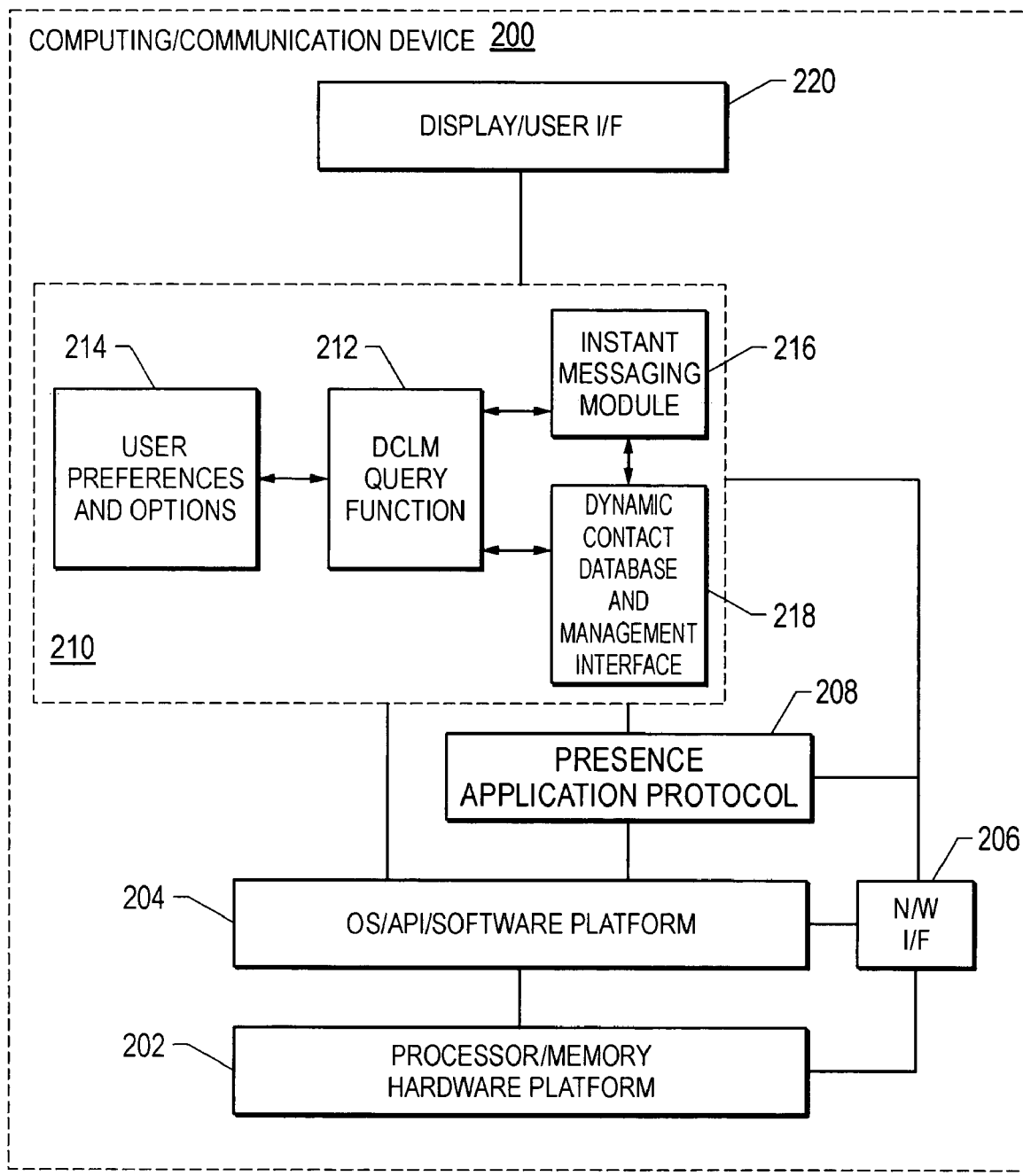
FIG. 2 depicts a functional block diagram of a computing/communication device having the DCLM functionality according to an embodiment of the present invention.

FIG. 2 depicts a functional block diagram of a computing/communication device 200 having the DCLM functionality according to an embodiment of the present invention. By way of implementation, device 200 may be provided as a communication device associated with a networked party for accessing the presence-aware network 104 of the communications network environment 100 described above. A processor/memory block 202 having any known or heretofore unknown architecture forms the hardware platform of the device 200. Operable thereon is a software platform 204 comprising an Operating System (OS) and suitable suite of application programming interfaces (APIs). Also provided is a network interface 206 for effectuating communication over the presence-aware network as well as instant messaging. A presence application protocol module 208 is illustrative of a network protocol stack (e.g., a SIP stack) adapted for transmitting and receiving presence information.

A DCLM module 210 includes a query generation function 212 that is operably coupled to an instant messaging (IM) module 216 (e.g., representative of known IM applications operable to provide IM services), a contact list or database 218 that includes appropriate database management interfaces for adding, deleting, and manipulating contact address data. Also, a database of user preferences and options 214 may be provided for further refinement of database query generation and contact list database management. As should be apparent to one skilled in the art, the contact list database and management logic 218 may be dynamically configurable, and can involve real-time input from the user. In addition, the user preferences/options database 214 may be populated, updated, and maintained in a number of ways. A display and/or user interface 220 is provided for supporting appropriate GUI-based dialog boxes and menus that facilitate user interaction as needed.

Figure 3A:
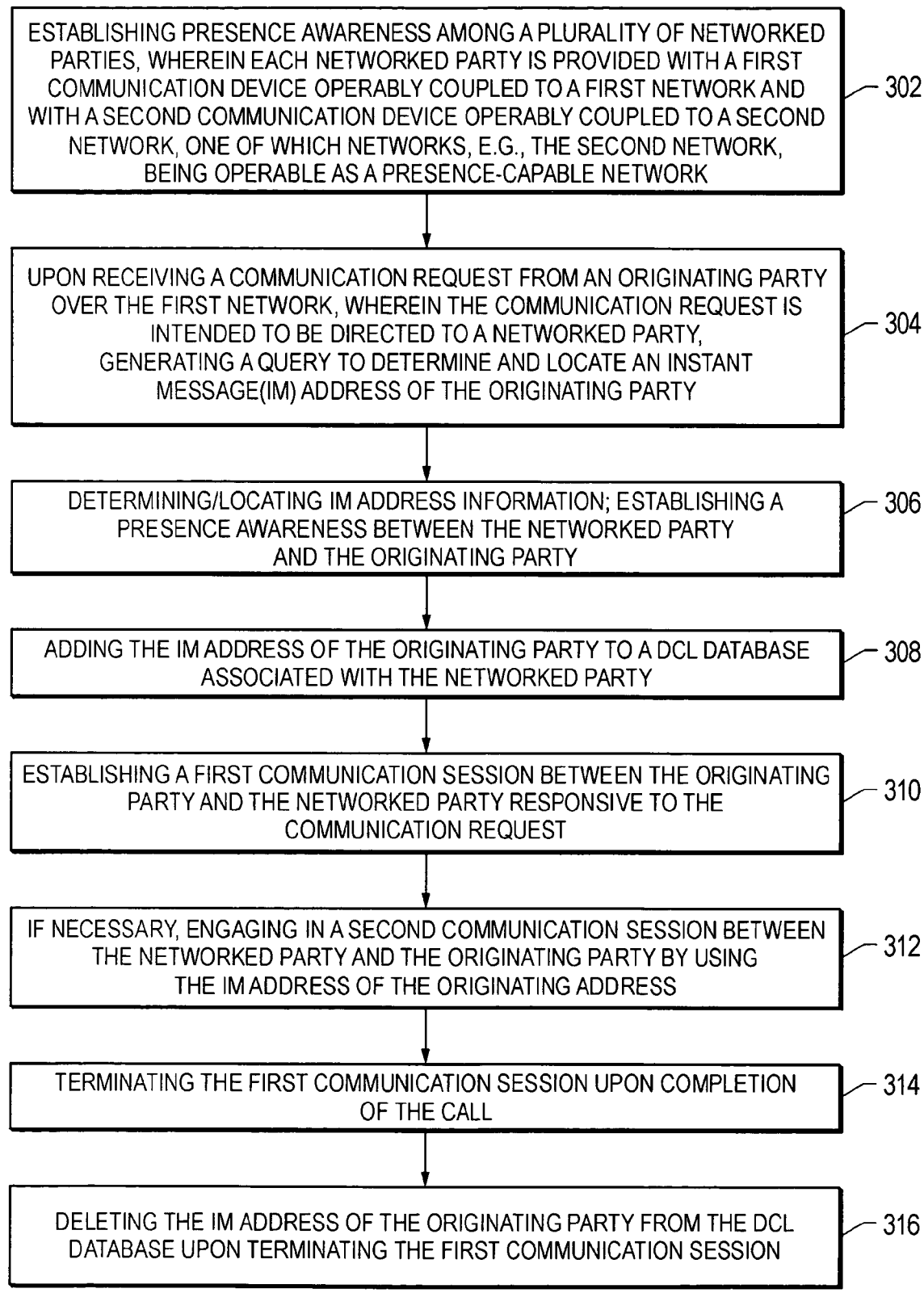
FIG. 3A is a flow chart of the operations involved in an embodiment of the DCLM methodology of the present invention.

FIG. 3A is a flow chart of the operations involved in an embodiment of the DCLM methodology of the present invention operable in a communications network environment such as the network environment 100 described hereinabove. Presence awareness may be established among a plurality of networked parties, wherein each networked party is provided with a first communication device operably coupled to a first network and with a second communication device operably coupled to a second network, one of which networks, e.g., the second network is being operable as a presence-capable network (block 302). Upon receiving a communication request from an originating party (i.e., an external originating party or an internal originating party) over the first network, wherein the communication request is intended to be directed to a particular networked party for whom a DCL database is provisioned, a query is generated by the DCLM logic of the second network to determine and locate an instant message (IM) address of the originating party (block 304). As set forth above, the query generation may be based on the incoming communication request, e.g., the calling party telephone number, and the query may comprise an IM-based "ASK JEEVES" type query for interrogating a database that is populated with matching <telephone number: IM address> tuples. Upon interpreting the query, a matching IM address is determined, which is then displayed to the networked party. Where there is no service database provisioned, the query is accomplished using a peer-to-peer request operable to be propagated on the IP network. Furthermore, the peer-to-peer query request may be cached in the originating party's communication device as a cookie for future reference.

Upon determining and locating the IM address and associated indicia of the originating party, presence awareness may be established between the particular networked party and the originating party (block 306). The IM address information relating to the originating party is added to a DCL database associated with the particular networked party using an appropriate database interface management module (block 308). A first communication session may be established between the originating party and the particular networked party responsive to the communication request (block 310). In addition, if necessary, a second communication session may be engaged between the particular networked party and the originating party by using the IM address of the originating party (block 312). The first communication session is terminated upon completion of the call (block 314), whereupon the IM address of the originating party may be deleted from the DCL database of the networked party, either substantially immediately or after being persistent for a predetermined amount of time (block 316).

Figure 3B:
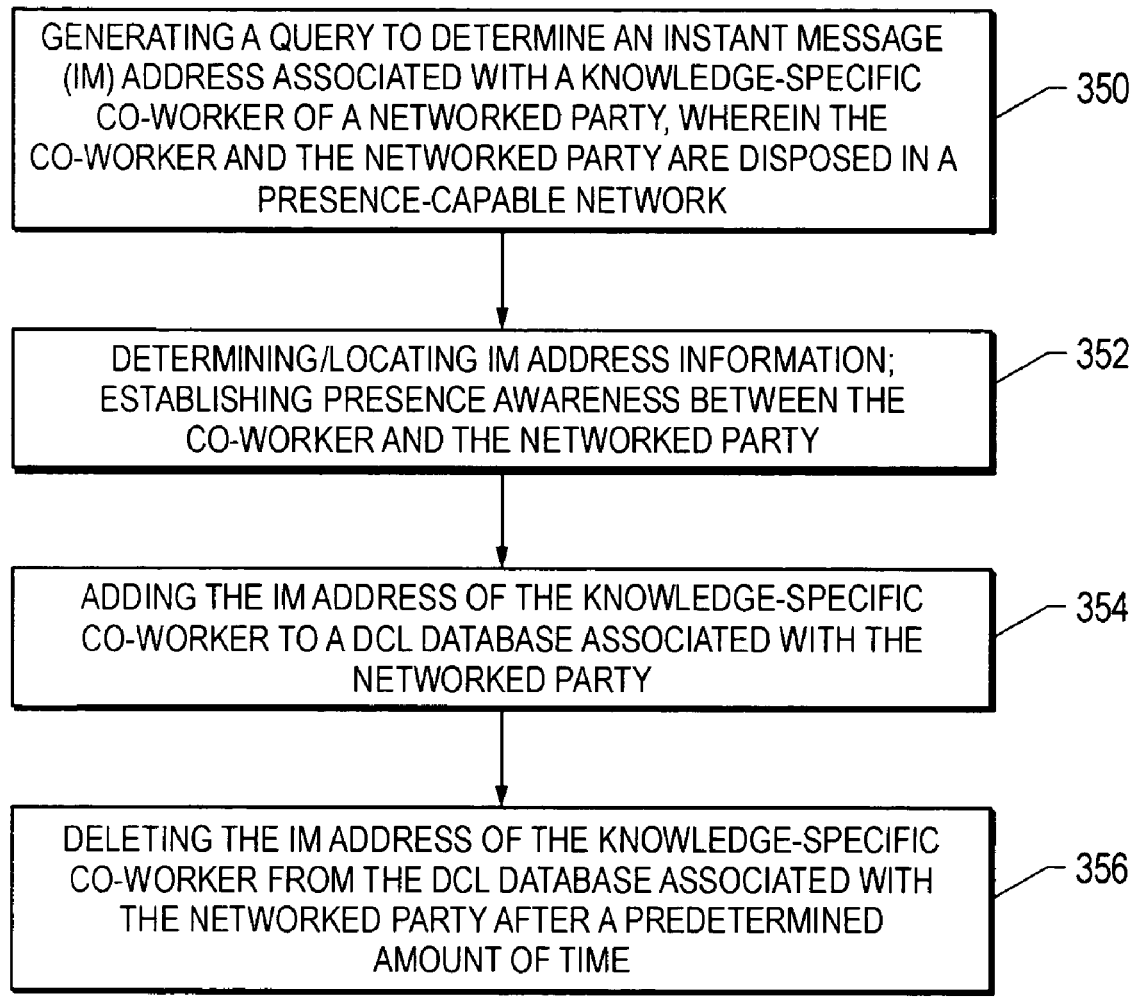
FIG. 3B is a flow chart of the operations involved in another embodiment of the DCLM methodology of the present invention.

FIG. 3B is a flow chart of the operations involved in another embodiment of the DCLM methodology of the present invention operable in a communications network environment. Again, a DCLM logic module of an enterprise communications network, e.g., an IP-based network, is operable to generate a query, periodically or on demand, for determining an IM address or related indicia associated with a knowledge-specific co-worker of a networked party, wherein the co-worker and the networked party are disposed in the presence-capable enterprise network (block 350). The query may again comprise an IM-based "ASK JEEVES" type query for interrogating a database such as an LDAP-based database with an extension of skill set server that is populated with matching <skill set: IM address> tuples. Upon interpreting the query, one or more matching IM addresses are determined depending on a particular database implementation, which may then be displayed to the networked party. Also, where there is no service database provisioned, the query is accomplished using a peer-to-peer request operable to be propagated on the IP network.

Upon discovering and locating the IM address/indicia of the knowledge-specific co-worker or co-workers, presence awareness between the co-worker(s) and the networked party may be established via a presence server using appropriate presence protocols (block 352). The IM address of the knowledge-specific co-worker is then added to a DCL database provisioned for the networked party (block 354), wherein the address may be deleted from the DCL database after a predetermined amount time (block 356), which can be based on the preferences and options of the networked party according to one implementation. Those skilled in the art will recognize that a similar methodology may also be employed for dynamically adding IM address and related indicia information of other resources, e.g., domain-specific ontologies, corporate documents, presentations, etc., to the database of a networked party, wherein suitable query requests may be appropriately tailored based on particular concepts, keywords, contexts, and the like.

Figure 4:
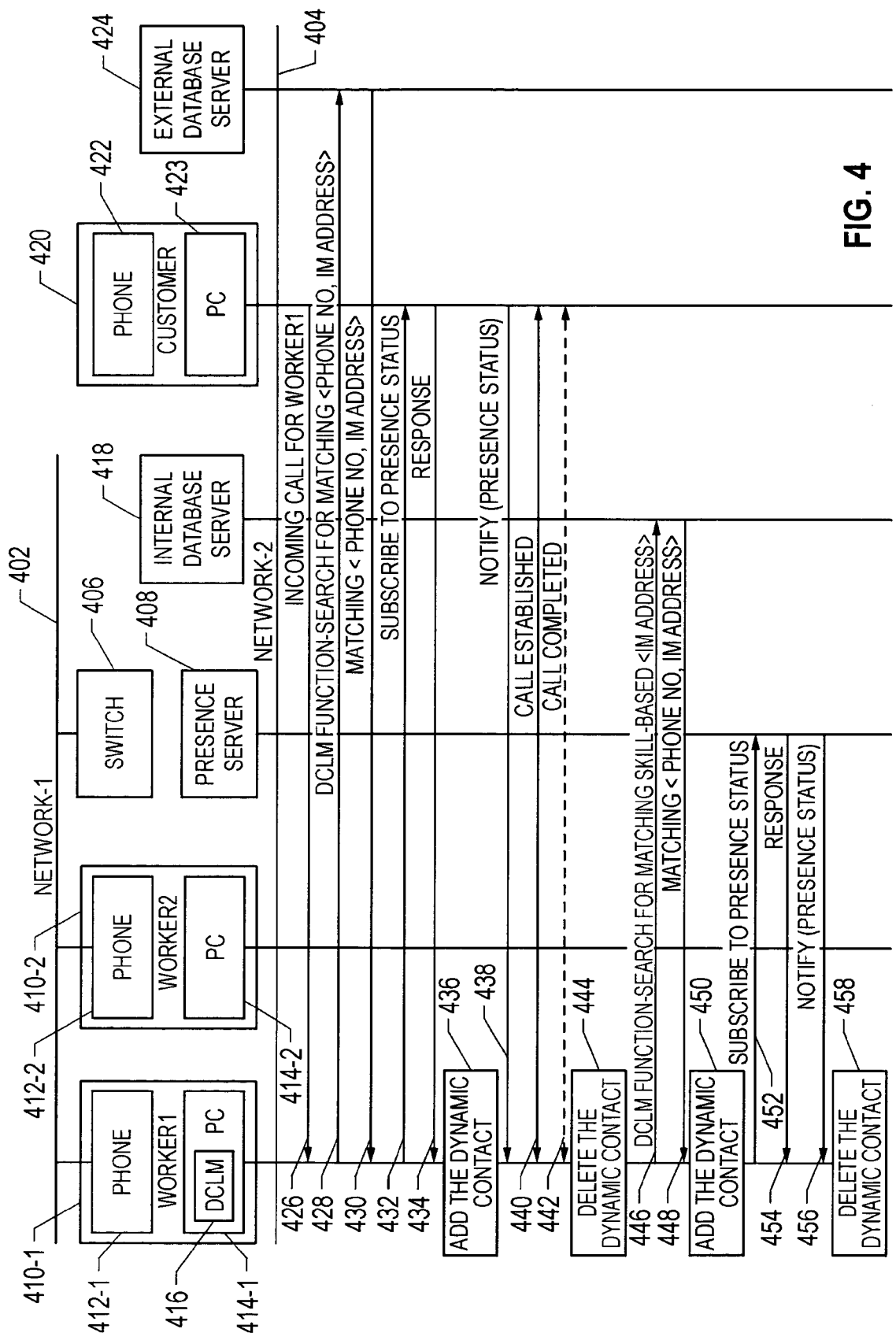
FIG. 4 depicts a message flow diagram for implementing an exemplary enterprise-level embodiment of the DCLM methodology according to an aspect of the present invention.

FIG. 4 depicts a message flow diagram for implementing an exemplary enterprise-level embodiment of the DCLM methodology according to one aspect of the present invention wherein the two scenarios described above are exemplified. Network-1 402 including a switch 406 is provided to be an enterprise-level digital phone network, e.g., a PBX network having a PBX switch, wherein each of the networked parties, for instance, Worker1 410-1 and Worker2 410-2, is equipped with a PBX phone. Reference numerals 412-1 and 412-2 refer to the two phones associated with Workers 410-1 and 410-2, respectively. Network-2 404 including a presence server 408 is operable as the enterprise's IP-based network adapted for collecting, communicating and establishing presence information, wherein each networked party is equipped with a personal computer (PC) for interfacing with Network-2 404. In particular, reference numerals 414-1 and 414-2 refer to the two IM-capable PCs associated with Workers 410-1 and 410-2, respectively, where Worker1's PC 414-1 is also equipped with a logic module 416 that is operable to execute the DCLM functionality discussed above.

An internal contact database server 418 (e.g., LDAP server with appropriate extensions) and an external contact database server 424 (e.g., a white pages server) are also exemplified in FIG. 4. Additionally, an external originating party is exemplified by customer 420 equipped with a phone 422 and a PC 423.

Upon receiving an incoming call 426 from customer 420 towards Worker1, the DCLM function 416 generates a search query 428 operable to interrogate the external contact database server 424. A successful reply message 430 includes the matching tuple which contains the customer's IM address. As part of establishing presence awareness between Worker1 410-1 and customer 420, Worker1 subscribes to the presence status of customer as exemplified by a message 432 towards customer, which elicits a suitable RESPONSE 434. Subsequently, customer 420 is added to the contact list of Worker1 as a dynamic contact (block 436). Thereafter, a call session 440 is established between Worker1 410-1 and the originating customer 420. Upon completion of the call, the call session may be terminated as indicated by reference numeral 442. Also, a NOTIFY message 438 is shown that provides a "peer-to-peer" notification, although not limited thereto. Worker1 410-1 can get customer's presence state via the customer's presence server (not shown in this FIGURE), or Worker1 can obtain the presence state of the customer 420 via its own presence server, where the worker's presence server is connected to customer's presence server. A second communication session may be established between the parties which can involve document sharing, video sharing, etc. After terminating the first communication session, i.e., call termination, customer 420 is deleted from the contact list of Worker1 410-1 as shown in block 444.

With respect to dynamically adding knowledge-specific entities as contacts, the DCLM function 416 is operable to generate a query 446 for interrogating the internal database server 418. A successful reply message 448 includes the matching tuple which contains the entity's IM address (which entity can be a co-worker, e.g., Worker2 410-2 or a knowledge resource). The matching IM address or addresses are added as dynamic contacts for Worker1 (block 450), which may persist as long as Worker1 maintains them or upon expiration of a predetermined amount of time. As part of establishing presence awareness between Worker1 410-1 and the knowledge-based entities, appropriate messaging is effectuated via the presence server 408, e.g., SUBSCRIBE 452, RESPONSE 454, and NOTIFY 456 messages. When the dynamic contacts are no longer needed, the IM addresses or associated indicia are deleted from the database as shown in block 458.

Based on the foregoing Detailed Description, it should be appreciated that the present invention advantageously provides a DCLM mechanism that supports concurrent sessions involving escalated communications on an as-needed basis in a networked environment. Since the IM contact address information is dynamically acquired, contact lists can be more effectively managed in terms of context-specificity. Accordingly, value propositions such as efficient contact management, expertise-sharing based on contact member skill sets, et cetera, may be enabled, particularly in enterprises such as call centers and the like.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A dynamic contact list management method operable in a communications network environment, comprising:
   upon receiving a communication request from an originating party towards a networked party over a first network, generating a query to determine an instant message (IM) address associated with said originating party for communication via a presence-aware network;
   receiving a reply to the query that includes the IM address of the originating party;
   subscribing to presence status of the originating party to establish presence awareness between said originating party and said networked party in relation to the presence-aware network;
   adding said IM address of said originating party to a contact list database provisioned for said networked party;
   establishing a first communication session responsive to said communication request between said originating party and said networked party via the first network; and
   deleting said IM address of said originating party from said contact list database responsive to terminating said first communication session.

2. The method as recited in claim 1, wherein said IM address is deleted from the contact list database substantially immediately upon termination of said first communication session.

3. The method as recited in claim 1, wherein said IM address is deleted from the contact list database after being persistent for a predetermined amount of time.

4. The method as recited in claim 1, wherein said first network comprises a network selected from the group consisting of a Private Branch Exchange (PBX) network, a Public Switched Telephone Network (PSTN) and an Internet Protocol (IP)-based network.

5. The method as recited in claim 1, wherein said communication request is related to at least one of voice communication, video communication, data communication, text message communication, electronic mail communication, and multimedia communication.

6. The method as recited in claim 1, wherein said second presence-aware network comprises a Internet Protocol (IP)-based network.

7. The method as recited in claim 6, wherein said IP-based network comprises at least one of a local area network, a wide area network, an enterprise intranet network, and a public packet-switched network.

8. The method as recited in claim 6, wherein said IP-based network comprises a wide area network is operable with a protocol selected from the group consisting of Session Initiation Protocol (SIP), Extensible Messaging and Presence Protocol (XMPP) and IBM Sametime protocol.

9. The method as recited in claim 1, wherein said query comprises a peer-to-peer request propagated over said presence-aware network.

10. The method as recited in claim 1, wherein said query comprises a database query for searching a service database to determine said IM address.

11. The method as recited in claim 10, wherein said service database comprises a third-party database associated with a white pages server.

12. The method as recited in claim 10, wherein said service database comprises an internal database that is operable to serve an enterprise including said networked party.

13. The method as recited in claim 1, further comprising:
   engaging in a second communication session between the networked party and the originating party using the IM address of the originating party.

14. The method as recited in claim 13, wherein said second communication session comprises at least one of an instant message session, a text chat session, a multimedia session, a document exchange session, and a desktop sharing session.

15. A dynamic contact list management system operable in a communications network environment, comprising:
   means for generating a query to determine an instant message (IM) address associated with an originating party for communication via a presence-aware network, said means operating responsive to a communication request received from said originating party towards a networked party over a first network;
   means for receiving a reply to the query that includes the IM address of the originating party;
   means for subscribing to presence status of the originating party to establish presence awareness between said originating party and said networked party in relation to the presence-aware network;
   database management means for adding said IM address of said originating party to a contact list database provisioned for said networked party;
   means for establishing a first communication session responsive to said communication request between said originating party and said networked party via the first network; and
   database management means for deleting said IM address of said originating party from said contact list database responsive to terminating said first communication session.

16. The system as recited in claim 15, wherein said IM address is deleted from the contact list database substantially immediately upon termination of said first communication session.

17. The system as recited in claim 15, wherein said IM address is deleted from the contact list database after being persistent for a predetermined amount of time.

18. The system as recited in claim 15, wherein said first network comprises a network selected from the group consisting of a Private Branch Exchange (PBX) network, a Public Switched Telephone Network (PSTN) and an Internet Protocol (IP)-based network.

19. The system as recited in claim 16, wherein said communication request is related to at least one of voice communication, video communication, data communication, text message communication, electronic mail communication, and multimedia communication.

20. The system as recited in claim 15, wherein said presence-aware network comprises a Internet Protocol (IP)-based network.

21. The system as recited in claim 20, wherein said IP-based network comprises at least one of a local area network, a wide area network, an enterprise intranet network, and a public packet-switched network.

22. The system as recited in claim 20, wherein said IP-based network is operable with a protocol selected from the group consisting of Session Initiation Protocol (SIP), Extensible Messaging and Presence Protocol (XMPP) and IBM Sametime protocol.

23. The system as recited in claim 15, wherein said query comprises a peer-to-peer request propagated over said presence-aware network.

24. The system as recited in claim 15, wherein said query comprises a database query for searching a service database to determine said IM address.

25. The system as recited in claim 24, wherein said service database comprises a third-party database associated with a white pages server.

26. The system as recited in claim 24, wherein said service database comprises an internal database that is operable to serve an enterprise including said networked party.

27. The system as recited in claim 15, further comprising:
means for engaging in a second communication session between the networked party and the originating party using the IM address of the originating party.

28. The system as recited claim 27, wherein said second communication session comprises at least one of an instant message session, a text chat session, a multimedia session, a document exchange session, and a desktop sharing session.

29. A dynamic contact list management method operable in a communications network environment, comprising:
generating a query to determine an instant message (IM) address associated with a knowledge-specific entity for communication between a networked party and the knowledge-specific entity via a presence-capable network;
receiving a reply to the query that includes the IM address of the knowledge-specific entity;
subscribing to presence status of the knowledge-specific entity to establish presence awareness between said knowledge-specific entity and said networked party in relation to the presence-capable network;
adding said IM address of said knowledge-specific entity to a contact list database provisioned for said networked party; and
deleting said IM address of said knowledge-specific entity from said contact list database after a predetermined amount of time.

30. The method as recited in claim 29, wherein said query comprises a peer-to-peer request operable to be propagated over said presence-capable network.

31. The method as recited in claim 29, wherein said query comprises a database query for searching a service database to determine said IM address.

32. The method as recited in claim 31, wherein said service database comprises an internal database that is operable to serve an enterprise including said networked party and said knowledge-specific entity.

33. The method as recited in claim 29, wherein said presence-capable network comprises a Internet Protocol (IP)-based network.

34. The method as recited in claim 33, wherein said IP-based network comprises a local area network operable with a protocol selected from the group consisting of Session Initiation Protocol (SIP), Extensible Messaging and Presence Protocol (XMPP) and IBM Sametime protocol.

35. The method as recited in claim 33, wherein said IP-based network comprises a wide area network operable with a protocol selected from the group consisting of Session Initiation Protocol (SIP), Extensible Messaging and Presence Protocol (XMPP) and IBM Sametime protocol.

36. The method as recited in claim 33, wherein said IP-based network comprises an enterprise intranet network operable with a protocol selected from the group consisting of Session Initiation Protocol (SIP), Extensible Messaging and Presence Protocol (XMPP) and IBM Sametime protocol.

37. The method as recited in claim 33, wherein said IP-based network comprises a public packet-switched network operable with a protocol selected from the group consisting of Session Initiation Protocol (SIP), Extensible Messaging and Presence Protocol (XMPP) and IBM Sametime protocol.

38. A dynamic contact list management system operable in a communications network environment, comprising:
means for generating a query to determine an instant message (IM) address associated with a knowledge-specific entity for communication between a networked party and the knowledge-specific entity via a presence-capable network;
receiving a reply to the query that includes the IM address of the knowledge-specific entity;
means for subscribing to presence status of the knowledge-specific entity to establish presence awareness between said knowledge-specific entity and said networked party in relation to the presence-capable network;
database management means for adding said IM address of said knowledge-specific entity to a contact list database provisioned for said networked party; and
database management means for deleting said IM address of said knowledge-specific entity from said contact list database after a predetermined amount of time.

39. The system as recited in claim 38, wherein said query comprises a peer-to-peer request operable to be propagated over said presence-capable network.

40. The system as recited in claim 38, wherein said query comprises a database query for searching a service database to determine said IM address.

41. The system as recited in claim 40, wherein said service database comprises an internal database that is operable to serve an enterprise including said networked party and said knowledge-specific entity.

42. The system as recited in claim 38, wherein said presence-capable network comprises a Internet Protocol (IP)-based network.

43. The system as recited in claim 42, wherein said IP-based network comprises a local area network operable with a protocol selected from the group consisting of Session Initiation Protocol (SIP), Extensible Messaging and Presence Protocol (XMPP) and IBM Sametime protocol.

44. The system as recited in claim 42, wherein said IP-based network comprises a wide area network operable with a protocol selected from the group consisting of Session Initiation Protocol (SIP), Extensible Messaging and Presence Protocol (XMPP) and IBM Sametime protocol.

45. The system as recited in claim 42, wherein said IP-based network comprises an enterprise intranet network operable with a protocol selected from the group consisting of Session Initiation Protocol (SIP), Extensible Messaging and Presence Protocol (XMPP) and IBM Sametime protocol.

46. The system as recited in claim 42, wherein said IP-based network comprises a public packet-switched network operable with a protocol selected from the group consisting of Session Initiation Protocol (SIP), Extensible Messaging and Presence Protocol (XMPP) and IBM Sametime protocol.

* * * * *